United States Patent Office 3,513,105
Patented May 19, 1970

3,513,105
LUMINESCENT MATERIALS
Harold Francis Ward, London, England, assignor to British Lighting Industries Limited, London, England
No Drawing. Filed Aug. 11, 1967, Ser. No. 659,883
Claims priority, application Great Britain, Aug. 18, 1966, 37,108/66
Int. Cl. C09k 1/30
U.S. Cl. 252—301.6           3 Claims

ABSTRACT OF THE DISCLOSURE

A luminescent material corresponding to the formula $x\text{ZrO}_2 : y\text{MO} : z\text{TiO}_2 : \text{P}_2\text{O}_5$ where $x=2\text{–}16$, $y=2$, $z=0.002\text{–}0.012$, and M=Mg, Ca, Sr, Ba, Zn, or a mixture thereof. The material is made by firing the oxides, or compounds which on firing yield the oxides, of Zr, M, Ti, and P in a covered crucible at from 1100° C. to 1400° C. When exposed to short wave or long wave ultraviolet or cathode rays the material emits a greenish blue color.

---

The present invention relates to luminescent materials for use in discharge devices and cathode ray tubes, and the manufacture thereof and, more especially, materials which are excited by ultra-violet radiation and suitable for use in fluorescent lamps.

It has been found that if a mixture of the oxides of zirconium, of an alkaline earth metal or zinc, and of titanium in an activating proportion, together with phosphorus pentoxide, or compounds equivalent to or on heating yielding these oxides, is fired, a luminescent material is obtained.

The resulting luminescent materials can be defined as zirconium alkaline earth metal (or zinc) phosphates activated by titanium. In general, the new materials may be represented by the formula:

$$x\text{ZrO}_2 : y\text{MO} : z\text{TiO}_2 : \text{P}_2\text{O}_5$$

where $x=2\text{–}16$, $y=2$, $z=0.002\text{–}0.012$ and M=Mg, Ca, Sr, Ba or Zn. Mixtures of the Group II metals can be employed, but the total quantity should be equivalent to 2 in the above formula. The proportions do not represent the limits of fluorescence, but rather those materials showing a useful or substantial emission. When exposed to short (2537 A.) or long (3650 A.) ultra-violet or cathode rays, these materials emit a greenish blue colour. The phosphors according to the invention also display a distinctive afterglow, or continued emission after withdrawal of the source of excitation.

If materials having the highest level of emission are required, it is preferred that the following restricted limits should be adhered to, namely, where $x=4.5\text{–}6$, $y=2$, $z=0.002\text{–}0.006$, and the alkaline earth metal is calcium.

Zirconium dioxide is a refractory material and relatively inert. It has been found that the brightest emission of the product is obtained if the zirconium oxide used for the purposes of the invention has not been rendered inert by firing or drying. Alternatively, a zirconium or zirconyl salt which on heating yields zirconium dioxide may be employed. The phosphorus pentoxide is conveniently added in the form of a phosphate, either of the Group II metal or of zirconium.

It has also been found that hafnium, which is usually present in zirconium salts, does not interfere with the luminescent activity of the product. On the other hand, the presence of heavy metals such as iron, cobalt, nickel and manganese above 0.02% has a deleterious effect on the product, as is often the case in the phosphor art.

The preferred method of firing is in a lidded crucible at 1100–1400° C.

The following are specific examples of the preparation of luminescent materials according to the invention. The ingredients employed are commercially available materials of good purity and are carefully weighed and blended together, for example by ball milling.

EXAMPLE 1

| | G. |
|---|---|
| $\text{ZrO}_2$ | 30.0 |
| $\text{CaHPO}_4$ | 13.6 |
| $\text{TiO}_2$ | 0.02 |

The materials are blended and then fired in a lidded crucible in air for 1 hr. at 1200° C., 1 hr. at 1250° C. and 1 hr. at 1275° C.

EXAMPLE 2

| | G. |
|---|---|
| $\text{ZrOCl}_2$ | 87.9 |
| $\text{CaHPO}_4$ | 13.6 |
| $\text{TiO}_2$ | 0.02 |

The blended materials are fired in a lidded silica crucible in air for 1 hr. at 1100° C., 1 hr. at 1200° C. and 1 hr. at 1250° C.

EXAMPLE 3

| | G. |
|---|---|
| $\text{ZrP}_2\text{O}_7$ (70%) | 19.0 |
| $\text{CaCO}_3$ | 10.0 |
| $\text{ZrO}_2$ | 27.0 |
| $\text{TiO}_2$ | 0.02 |

The blended materials are fired in a lidded silica crucible in air for 1 hr. at 1200° C., 1 hr. at 1200° C. and 1 hr. at 1300° C.

I claim:
1. A luminescent material consisting essentially of a titanium activated phosphate of zirconium and at least one metal selected from the group consisting of alkaline earth metals and zinc, said luminescent material having the formula:

$$x\text{ZrO}_2 : y\text{MO} : z\text{TiO}_2 : \text{P}_2\text{O}_5$$

where $x=2$ to 16 and $y=2$ and $z=0.002$ to 0.012 and M=Mg, Ca, Sr, Ba, Zn or a mixture thereof.

2. A material according to claim 1 wherein $x=4.5\text{–}6$, $z=0.002\text{–}0.006$ and the alkaline earth metal is calcium.

3. A method of making the luminescent material recited in claim 1 which comprises preparing a mixture of the oxides, or compounds which on heating yield the oxides, of zirconium, at least one metal selected from the alkaline earth metals and zinc, and titanium in activating proportion together with phosphorus pentoxide or compound which on heating yields phosphorus pentoxide, and firing the said mixture in a covered vessel at 1100–1400° C.

References Cited

UNITED STATES PATENTS 3,017,365   1/1962   Harrison.
3,210,289   10/1965   Subbarao.

TOBIAS E. LEVOW, Primary Examiner
R. D. EDMONDS, Assistant Examiner

U.S. Cl. X.R.
252—301.4